(12) United States Patent
Cobb

(10) Patent No.: US 7,823,981 B2
(45) Date of Patent: Nov. 2, 2010

(54) AERODYNAMIC WHEEL HUB

(75) Inventor: John Cobb, Tyler, TX (US)

(73) Assignee: Zero Products, LLC, Chicago, IL (US)

( * ) Notice: Subject to any disclaimer, the term of this patent is extended or adjusted under 35 U.S.C. 154(b) by 112 days.

(21) Appl. No.: 12/284,240

(22) Filed: Sep. 19, 2008

(65) Prior Publication Data

US 2009/0085397 A1    Apr. 2, 2009

Related U.S. Application Data

(60) Provisional application No. 60/994,652, filed on Sep. 20, 2007.

(51) Int. Cl.
*B60B 27/02*    (2006.01)

(52) U.S. Cl. .................... 301/110.5; 301/59

(58) Field of Classification Search ............ 301/6.2, 301/6.3, 6.9, 54, 55, 56, 57, 59, 60, 61, 73, 301/74, 110.5, 110.6; D12/207; 244/103 R
See application file for complete search history.

(56) References Cited

U.S. PATENT DOCUMENTS

| | | | | |
|---|---|---|---|---|
| 3,428,376 A | * | 2/1969 | Zeller | 384/544 |
| 5,332,295 A | * | 7/1994 | Vogel et al. | 301/110.5 |
| 5,647,643 A | * | 7/1997 | Noble | 301/110.5 |
| 6,688,704 B2 | * | 2/2004 | Meggiolan | 301/110.5 |
| 7,341,316 B2 | * | 3/2008 | Fukui | 301/108.1 |
| 7,413,262 B2 | * | 8/2008 | Ording et al. | 301/110.5 |
| 7,562,940 B2 | * | 7/2009 | D'Aluisio | 301/110.5 |
| 2007/0163850 A1 | * | 7/2007 | Addink et al. | 188/18 A |

FOREIGN PATENT DOCUMENTS

DE    3018049 A1 * 11/1981

* cited by examiner

*Primary Examiner*—S. Joseph Morano
*Assistant Examiner*—Kip T Kotter
(74) *Attorney, Agent, or Firm*—Seyfarth Shaw LLP

(57) ABSTRACT

A wheel hub is provided. The wheel hub includes an axle, a first spoke coupling member operably connected to the axle, a second spoke coupling member operably connected to the axle and an outer surface covering at least a portion of the axle. The outer surface is located between the first and second spoke coupling members and has a length and a thickness where the length is greater than the thickness.

6 Claims, 6 Drawing Sheets

AERODYNAMIC WHEEL HUB

CROSS REFERENCE TO RELATED APPLICATIONS

This application claims the filing benefit of U.S. Provisional Patent Application Ser. No. 60/994,652 filed on Sep. 20, 2007 and entitled "AERODYNAMIC WHEEL HUB", the disclosure of which is hereby incorporated by reference.

FIELD OF THE INVENTION

This invention relates generally to a wheel hub, and in more particular applications to a wheel hub for a bicycle, wherein the wheel hub has an aerodynamic shape.

BACKGROUND

Wheel hubs are often used to affix a wheel to a device, vehicle, cart and the like. For example, wheel hubs can be used to affix a bicycle wheel to the frame and/or fork of a bicycle. The hub can be used to cooperate with wheel spokes to permit the wheel to rotate relative to the bicycle. Generally, such hubs include an axle and, oftentimes a hub shell. The overall shape of such hubs is substantially cylindrical.

However, cylindrical wheel hubs are oftentimes not sufficiently aerodynamic and may produce turbulent air flow. The air flow over and around the hub can increase drag created by the wheel and wheel hub and resultantly slow the bicycle down. Competitive bicyclists look to minimize drag and weight while increasing performance of the bicycle.

To minimize drag, bicycle manufacturers have attempted to create disc-shaped wheels. However, these designs often have a greater surface area facing the wind, which does not necessarily decrease drag or may cause additional problems. For example, such disc-shaped wheels obviously must rotate with the wheel, thus, oftentimes, increasing the overall mass of the wheel. Since the overall mass of the wheel has been increased, it requires additional force to rotate the wheel. Additionally, solid disc-shaped wheels can be negatively affected by cross-winds.

SUMMARY

In one form, a wheel hub is provided. The wheel hub includes an axle, a first spoke coupling member rotatably connected to the axle, a second spoke coupling member operably connected to the axle and an outer surface covering at least a portion of the axle. The outer surface is located between the first and second spoke coupling members and has a length and a thickness where the length is greater than the thickness.

In accordance with one form, a wheel hub for a wheel is provided. The wheel hub includes an axle, at least one spoke coupling member and an outer surface. The at least one spoke coupling member being rotatably connected to the axle and operably coupled to the wheel to permit rotation of the wheel with respect to the hub. The outer surface being operably coupled to and covering at least a portion of the axle and also being generally wing shaped. The outer surface does not rotate when the at least one spoke coupling member rotates.

According to one form, the outer surface is aerodynamically shaped.

In accordance with one form, the outer surface is wing shaped.

In one form, the outer surface is integral with the axle.

According to one form, the outer surface is affixed to the axle.

In accordance with one form, the outer surface is made of carbon fiber.

In one form, the first and second spoke coupling members are operably connected to the axle via one or more bearings.

According to one form, the first and second spoke coupling members are operably connected to the axle via one or more bearing cartridges.

Other forms are also contemplated as understood by those skilled in the art.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its constructions and operation, and many of its advantages should be readily understood and appreciated.

DETAILED DESCRIPTION

Figure 1:
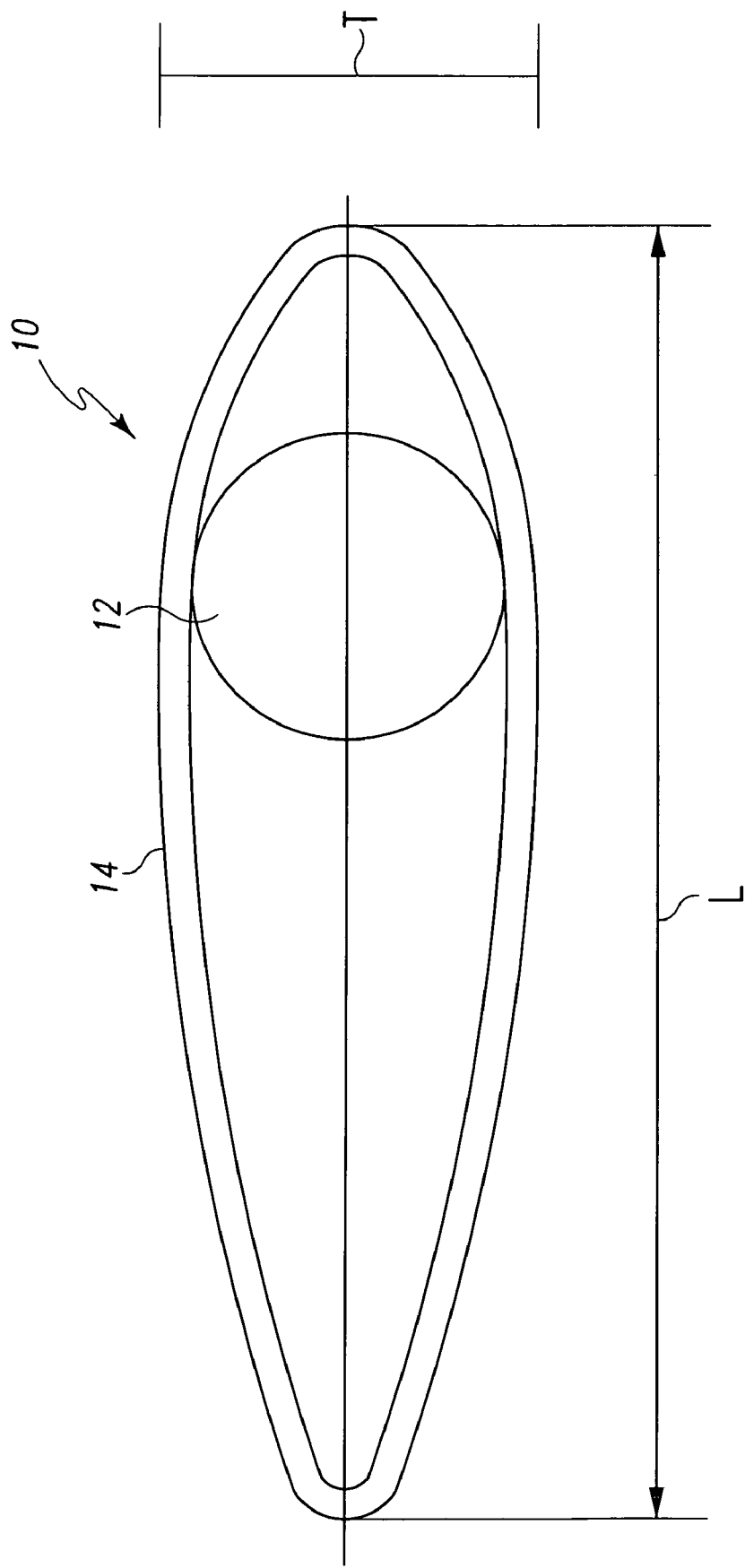
FIG. 1 is a cross-sectional view of a wheel hub having an aerodynamic outer surface.
Figure 2:
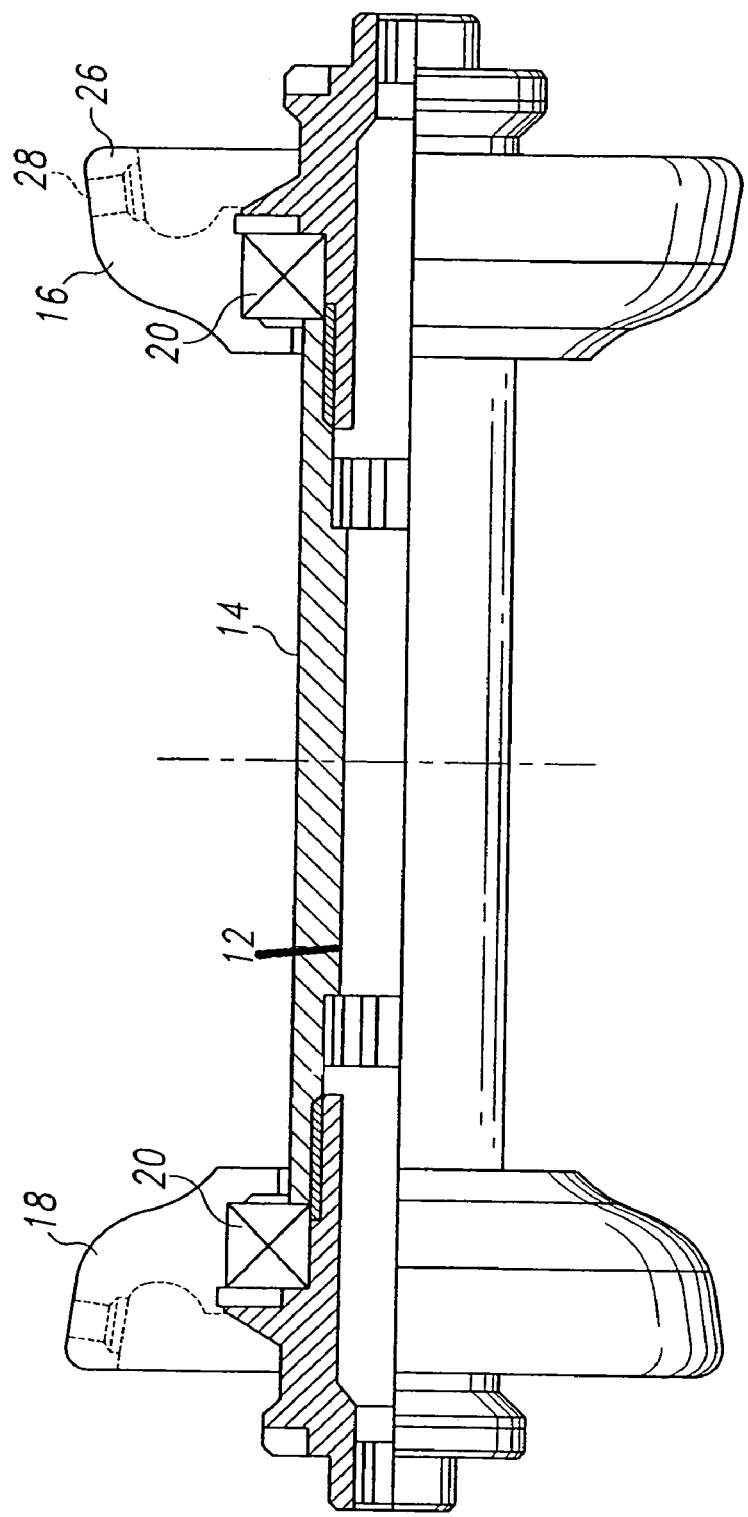
FIG. 2 is a partial cross-sectional view of a wheel hub.
Figure 3:
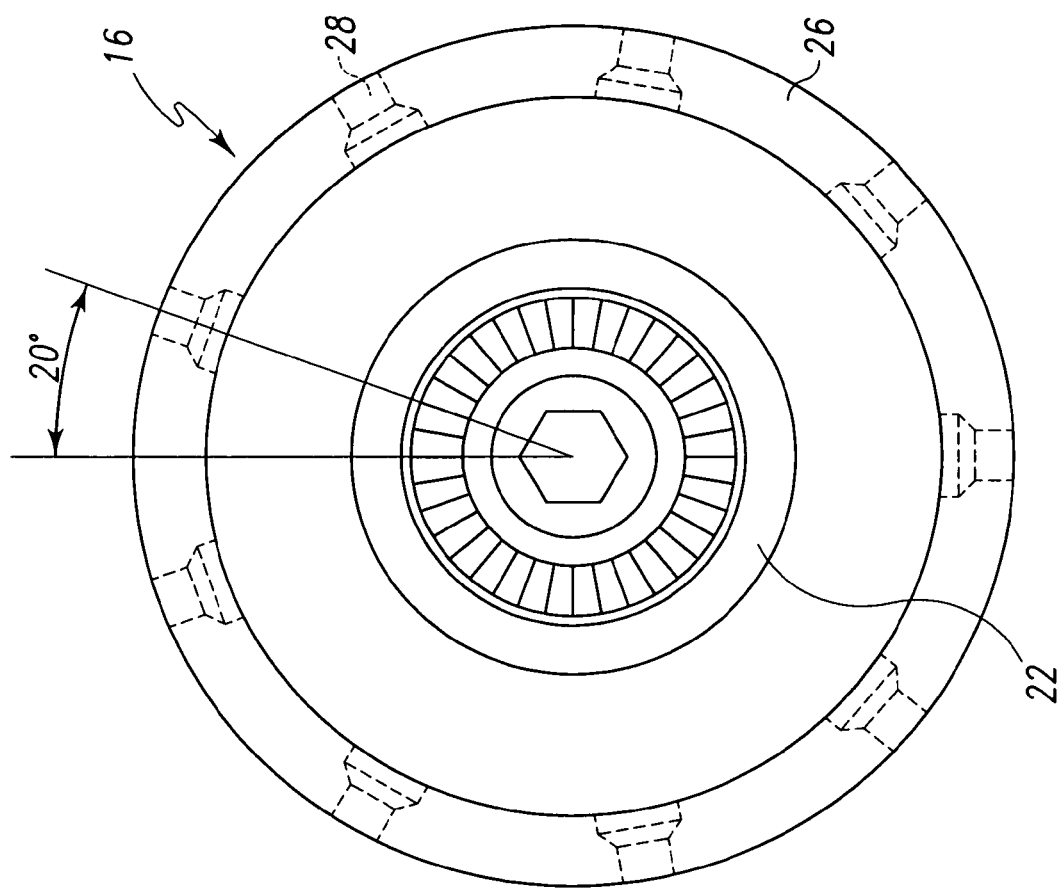
FIG. 3 is a side view of a spoke coupling member as shown in FIG. 2.

Referring to FIG. 1, a cross-sectional view of a portion of a wheel hub 10 is shown. The wheel hub 10 includes a shaft or axle 12 and an outer fairing or surface 14 covering at least a portion of the axle 12. Referring to FIG. 2, the wheel hub 10 also includes a first spoke coupling member 16 and a second spoke coupling member 18. While the term spoke is used herein, other structures similar to spokes, such as a solid wheel may be used to couple the wheel to the hub.

Each of the first and second spoke coupling members 16,18 is operably connected to the axle 12 via one or more bearings or bearing cartridges. For example, as seen in FIG. 2, each of the first and second spoke coupling members 16,18 is operably connected to the axle 12 via bearing cartridges 20. However, it should be understood that the first and second spoke coupling members 16,18 may be operably connected to the axle 12 via other methods and structures. Moreover, a single spoke coupling member may be utilized as understood by those skilled in the art.

Figure 4:
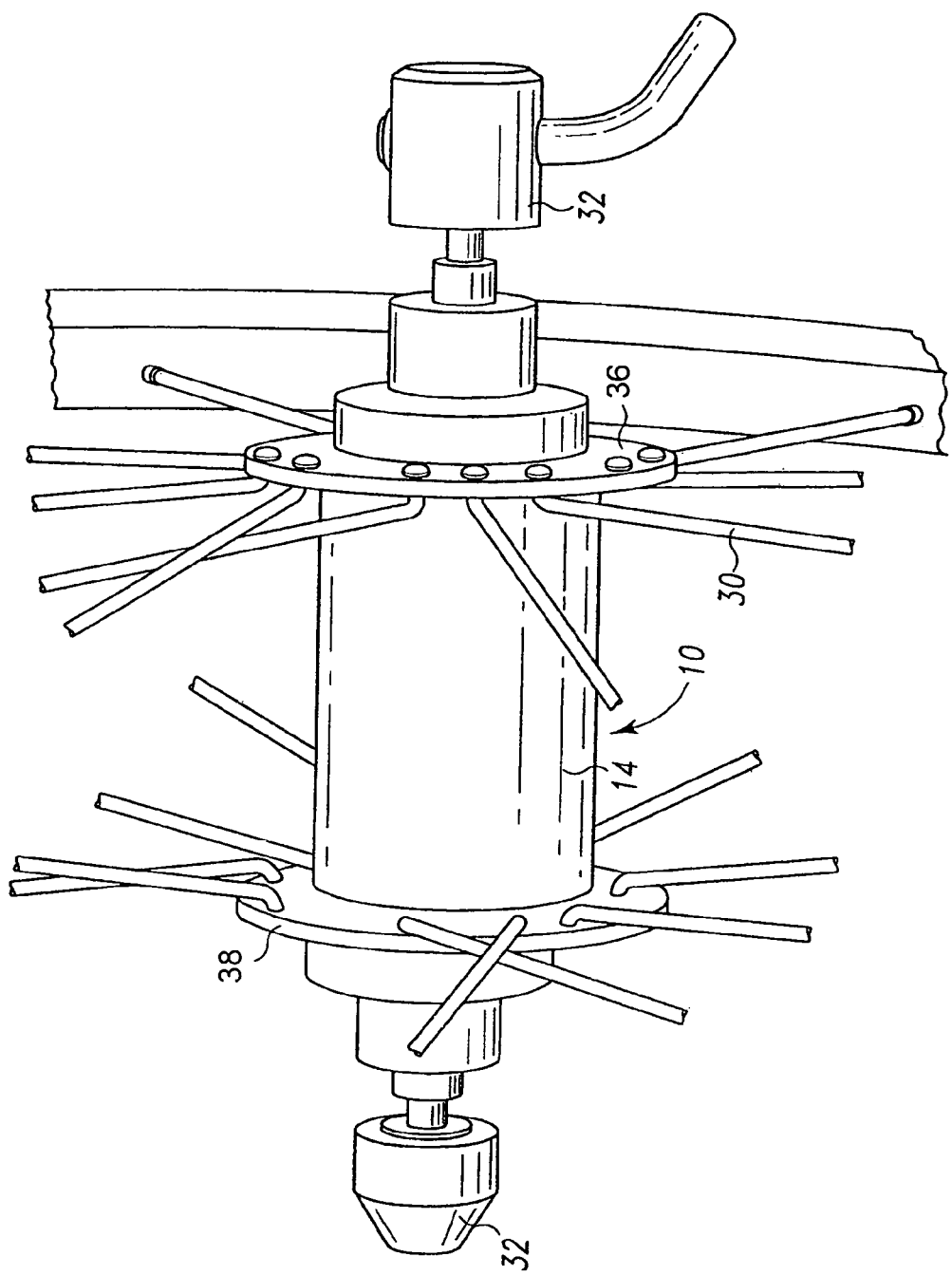
FIG. 4 is a top view of a wheel hub having an aerodynamic shape as assembled as part of a bicycle wheel.
Figure 5:
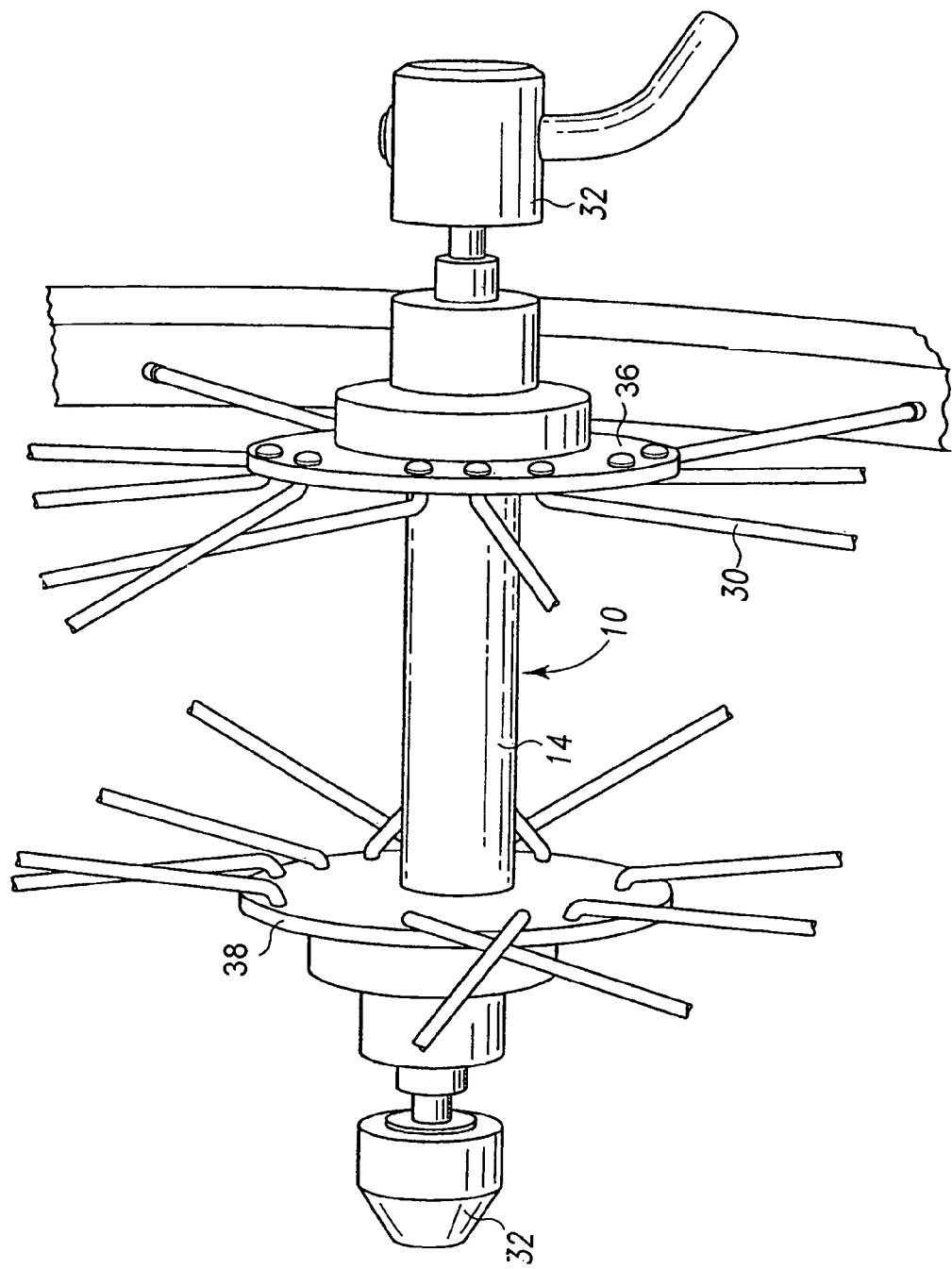
FIG. 5 is a front view of the wheel hub of FIG. 4.

The outer surface 14 is located about the axle 12 between the first and second spoke coupling members 16,18. In one form, the outer surface 14 extends substantially the entire distance between the first and second coupling members 16,18. However, it should be understood that the outer surface need not extend substantially the entire distance between the first and second coupling members 16,18. An alternative form showing first and second coupling members 36,38 is shown in FIGS. 4 and 5.

Figure 6:
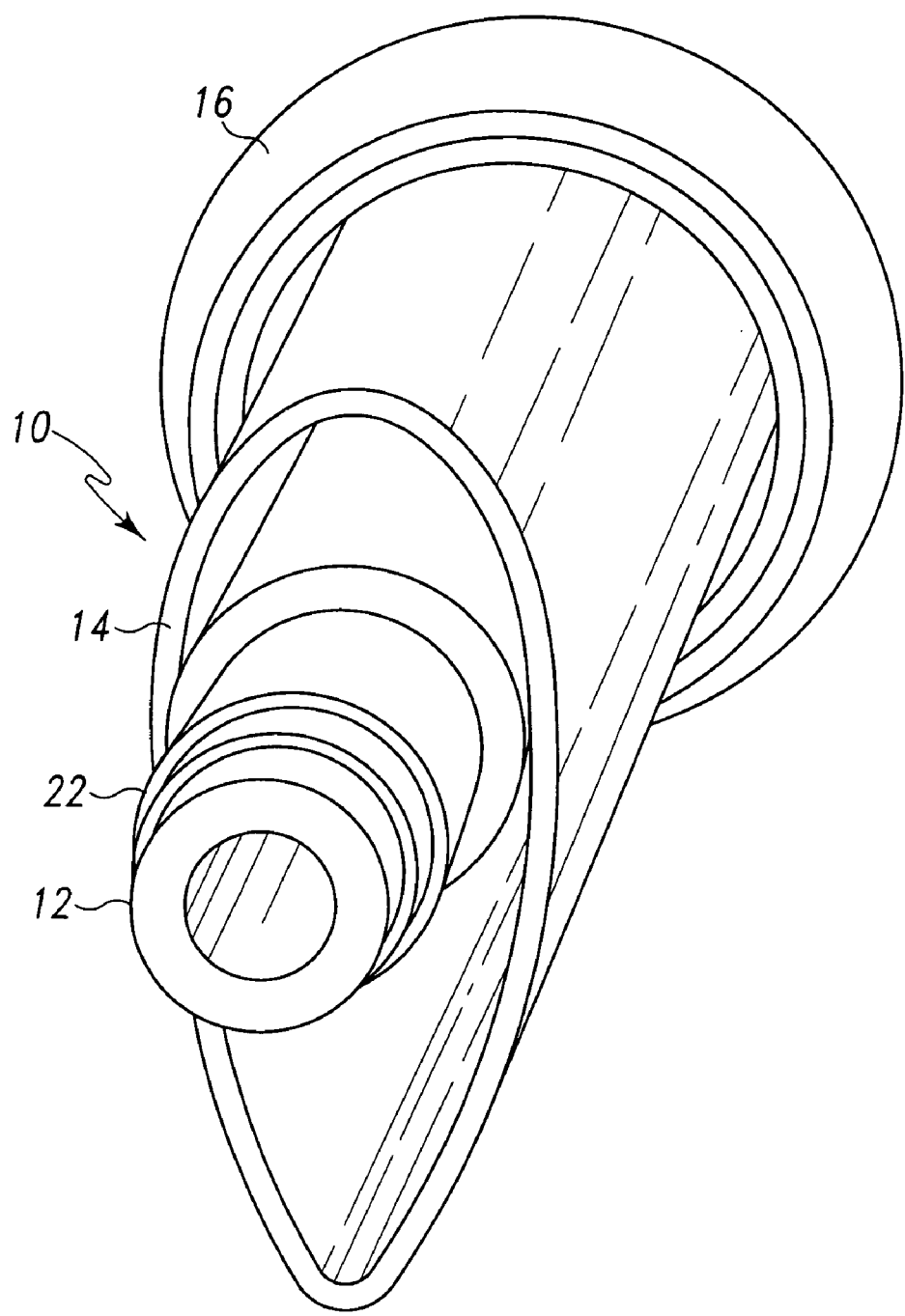
FIG. 6 is a perspective view of a partially disassembled wheel hub having an aerodynamic shape.

Referring to FIGS. 1 and 6, in one form, the outer surface 14 has a generally aerodynamic shape. For example, as shown in the figures, the outer surface 14 has a wing shape. It should be understood that the outer surface 14 can take a variety of other shapes. For example, the outer surface 14 can have an oval shape or other shape understood by those skilled in the art.

In one form, the outer surface 14 has a length L and a thickness T, as shown in FIG. 1. In one form, the length L is greater than the thickness T. In this manner, the length L extends along the direction of air flow across the hub 10. In this manner, in some instances, the shape and orientation of the outer surface 14 can decrease drag and/or decrease turbulent air flow around the hub 10. It should be understood that the length L and thickness T can be varied as desired.

The outer surface 14 may also be included as part of the hub 10 in a variety of manners. For example, in FIG. 1, the outer surface 14 is a separate component from the axle 12 and is affixed to the axle 12. In this manner, the axle 12 can include slots (not shown) to retain the outer surface 14 in a desired orientation. The outer surface 14 may also be affixed to the axle 12 using intermediate layers 22, such as shown in FIG. 6. Additionally, the outer surface 14 may be affixed to the axle 12 using adhesives and other components as understood by those skilled in the art. In a preferred form, the outer surface 14 does not rotate when the wheel rotates. In this manner, the outer surface 14 may be affixed to the axle 12, either directly or indirectly, such that the combined structure does not rotate relative to the bicycle (not shown) when the wheel rotates.

The hub 10 may also include additional components as understood by those skilled in the art. For example, the hub 10 may also include cones (not shown) or other retaining structure to maintain the first and second spoke coupling members 16,18 on the axle 12. Additionally, the first and second spoke coupling members 16,18 may include further structure such as flange 26 and spoke openings 28. The flanges 26 and spoke openings 28 cooperate to affix spokes 30 to the hub 10. Furthermore, the hub 10 may also include additional structure such as nuts (not shown) and quick release couplings 32 for affixing the hub 10 to a bicycle or other structure.

The hub may be made from a variety of materials. For example, the axle 12 may be made from metal, metal alloys, carbon fiber and the like as understood by those skilled in the art. The outer surface 14 may be made from metal, metal alloys, carbon fiber, plastic and the like as understood by those skilled in the art. In one form, the axle 12 is made from metal while the outer surface 14 is made from carbon fiber. Other materials and combinations of materials may also be chosen as understood by those skilled in the art.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A wheel hub for a wheel comprising:
   an axle;
   at least one spoke coupling member rotatably connected to the axle and operably coupled to the wheel to permit rotation of the wheel with respect to the hub; and
   an outer surface operably coupled to and covering at least a portion of the axle, the outer surface being generally wing shaped, wherein the outer surface does not rotate when the at least one spoke coupling member rotates.

2. The wheel hub of claim 1 wherein the outer surface is integral with the axle.

3. The wheel hub of claim 1 wherein the outer surface is affixed to the axle.

4. The wheel hub of claim 1 wherein the outer surface is made of carbon fiber.

5. The wheel hub of claim 1 further comprising first and second spoke coupling members operably connected to the axle via a plurality of bearings.

6. The wheel hub of claim 1 further comprising first and second spoke coupling members operably connected to the axle via a plurality of bearing cartridges.

* * * * *